US011972035B2

(12) United States Patent
Muthiah

(10) Patent No.: US 11,972,035 B2
(45) Date of Patent: Apr. 30, 2024

(54) KEY BASED PARTIAL DATA RESTRICTION IN STORAGE SYSTEMS

(71) Applicant: WESTERN DIGITAL TECHNOLOGIES, INC., San Jose, CA (US)

(72) Inventor: Ramanathan Muthiah, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 487 days.

(21) Appl. No.: 17/211,540

(22) Filed: Mar. 24, 2021

(65) Prior Publication Data

US 2022/0309194 A1 Sep. 29, 2022

(51) Int. Cl.
| | |
|---|---|
| *G06F 21/79* | (2013.01) |
| *G06F 3/06* | (2006.01) |
| *G06F 12/10* | (2016.01) |
| *H04L 9/08* | (2006.01) |
| *H04L 9/14* | (2006.01) |

(52) U.S. Cl.
CPC ............ *G06F 21/79* (2013.01); *G06F 3/0623* (2013.01); *G06F 3/0659* (2013.01); *G06F 3/0679* (2013.01); *G06F 12/10* (2013.01); *H04L 9/0894* (2013.01); *H04L 9/14* (2013.01); *G06F 2212/657* (2013.01); *H04L 2209/34* (2013.01)

(58) Field of Classification Search
CPC ...... G06F 21/79; G06F 3/0623; G06F 3/0659; G06F 3/0679; G06F 12/10; G06F 2212/657; H04L 9/0894; H04L 9/14; H04L 2209/34
See application file for complete search history.

(56) References Cited

U.S. PATENT DOCUMENTS

| | | | |
|---|---|---|---|
| 8,200,931 B2 | 6/2012 | Mann et al. | |
| 9,471,805 B2 | 10/2016 | Fisher et al. | |
| 9,529,735 B2 | 12/2016 | Hashimoto | |
| 10,061,910 B2 | 8/2018 | Bali et al. | |
| 2007/0156587 A1 | 7/2007 | Yu et al. | |
| 2021/0034039 A1* | 2/2021 | Lee | H04L 63/0823 |

* cited by examiner

*Primary Examiner* — Hee K Song
(74) *Attorney, Agent, or Firm* — ARENTFOX SCHIFF LLP

(57) ABSTRACT

Aspects of a storage device including a memory and a controller are provided. The controller can receive a data stream from a host device, the data stream indicating a plurality of encryption keys associated with the data stream, and segregate the data stream into a plurality of data stream portions based on the plurality of encryption keys. The controller can encode the plurality of data stream portions into a plurality of encoded data stream portions with the plurality of encryption keys. The controller also can generate a mapping indicating an association between each of the plurality of encryption keys with a respective one of the plurality of encoded data stream portions. Thus, the controller may store the plurality of encoded data stream portions and the plurality of encryption keys in the memory based on the mapping, thereby improving security access to data stored in the storage device.

20 Claims, 10 Drawing Sheets

KEY BASED PARTIAL DATA RESTRICTION IN STORAGE SYSTEMS

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

In data storage environments, protection of electronic data from unauthorized accesses or use by third parties may be necessary or desirable. For example, e-commerce, remote access, wireless networking, and/or other environments often utilize various data encryption/decryption protocols, or techniques, for securing data in order to preserve data confidentiality, integrity, and/or authenticity. Data encryption involves the conversion of information from a readable state to an apparently un-readable state through the use of cryptographic algorithms and/or keys. In data encryption systems, encryption keys are used to determine the functional output of cryptographic algorithms for the purpose of encrypting and/or decrypting data.

SUMMARY

One aspect of a storage device is disclosed herein. The storage device includes a memory and a controller. The controller is configured to receive a data stream from a host device, the data stream indicating a plurality of encryption keys associated with the data stream. The controller is also configured to segregate the data stream into a plurality of data stream portions based on the plurality of encryption keys. The controller is also configured to encode the plurality of data stream portions into a plurality of encoded data stream portions with the plurality of encryption keys. The controller is also configured to generate a mapping indicating an association between each of the plurality of encryption keys with a respective one of the plurality of encoded data stream portions. The controller is also configured to store the plurality of encoded data stream portions and the plurality of encryption keys in the memory based on the mapping.

Another aspect of a storage device is disclosed herein. The storage device includes a memory and a controller. The controller is configured to receive an encoded data stream from a host device, the encoded data stream comprising a plurality of encoded data stream portions associated with respective ones of a plurality of encryption keys. The controller is also configured to generate a mapping indicating an association between each of the plurality of encryption keys with one or more of a plurality of sub-stream identifiers that correspond to respective ones of the plurality of encoded data stream portions. The controller is also configured to store the plurality of encoded data stream portions and the plurality of encryption keys in the memory based on the mapping.

A further aspect of a storage device is disclosed herein. The storage device includes a memory and a controller. The controller is configured to receive a request to access encoded data stored in the memory from a host device, the request comprising a token corresponding to the requested encoded data. The controller is also configured to determine a matching encryption key that corresponds to the token from a plurality of encryption keys stored in a data structure of the memory. The controller is also configured to determine a sub-stream identifier corresponding to the requested encoded data that is associated with the matching encryption key based on a mapping between the plurality of encryption keys and respective ones of a plurality of sub-stream identifiers. The controller is also configured to obtain one or more encoded data stream portions that correspond to the sub-stream identifier from an encoded data stream in the memory. The controller is also configured to decode the one or more encoded data stream portions with the matching encryption key into respective decoded data stream portions. The controller is also configured to send the respective decoded data stream portions to the host device in response to the request.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present disclosure will now be presented in the detailed description by way of example, and not by way of limitation, with reference to the accompanying drawings, wherein.

DETAILED DESCRIPTION

Figure 1:
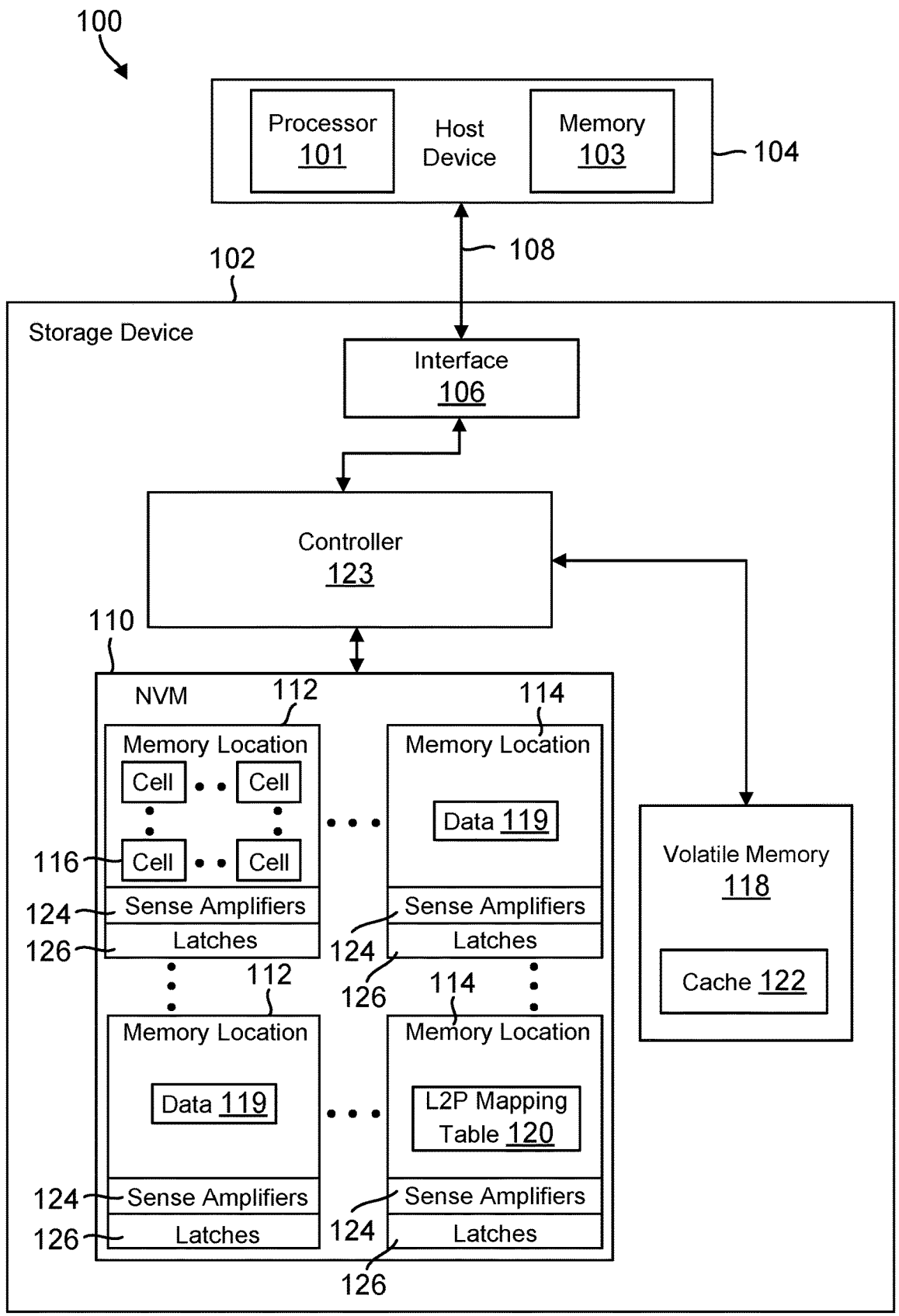
FIG. 1 is a block diagram illustrating an exemplary embodiment of a storage device in communication with a host device.

The detailed description set forth below in connection with the appended drawings is intended as a description of various exemplary embodiments of the present disclosure and is not intended to represent the only embodiments in which the present disclosure may be practiced. The detailed description includes specific details for the purpose of providing a thorough understanding of the present disclosure. However, it will be apparent to those skilled in the art that the present disclosure may be practiced without these specific details. In some instances, well-known structures and components are shown in block diagram form in order to avoid obscuring the concepts of the present disclosure. Acronyms and other descriptive terminology may be used merely for convenience and clarity and are not intended to limit the scope of the disclosure.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the disclosure include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present disclosure, with the understanding that such aspects may have a wide range of applications without departing from the spirit and scope of the present disclosure.

Large amounts of data can be stored in a storage system, which may cause the data retrieval to operate with suboptimal performance and unsecured when the storage device operation requires exclusive access to necessary data. In some applications, such as surveillance and other media applications, the associated programs are well knit for legacy reasons. Other systems that run data-intensive applications, such as autonomous vehicles, can generate significant amounts of data from multiple sensors (e.g., Light Detection and Ranging (LIDAR), radar, global positioning system (GPS), cameras, etc.), and different sensor data may be analyzed by different entities. In traditional approaches, the entire data can be retrieved from the storage device, and a host controller can retrieve the necessary programs. Such an approach not only increases data transfers, but also places unnecessary data (or non-requested data) that transfers between the storage device and the consumer (e.g., the host device) at risk. To secure data stored in legacy storage devices, encryption based on an encryption key may be maintained at a logical group. However, these legacy storage systems can treat all data as a single entity, which can result in suboptimal performance and unsecured retrieval mechanisms.

The present disclosure provides for a mechanism in key-based segregation, encryption and storage of data. A storage device can utilize different encryption keys provided by a data producer (e.g., a host device) to protect different programs (or different types of sensor data) available in a data stream prior to data storage. Additionally, the storage device can maintain an encryption key mapping table (e.g., program key mapping table, sensor key mapping table) to restrict common access of protected data. During a data access request from a consumer (e.g., the host device), the storage device can reverse map a received encryption key from the encryption key mapping table, and decrypt a protected identifier (ID) associated with the requested transport data (e.g., sensor ID/program ID) alone using a matching encryption key, and further send only a portion of the transport data (e.g., application data) for which the program ID/sensor ID matches with the received encryption key. Such program ID/sensor ID based encryption enables the storage device to restrict unwanted data at the beginning of the system chain itself, thereby securing the non-requested data while reducing the amount of latency in securing any necessary data. The key-based data segregation and encryption also allows the storage device to reduce processing resources needed to protect any specified data and increase the security of other protected data unassociated with a memory access request.

Data encryption may be used as a means to protect both active data, as well as inactive data stored in, for example, a data storage device. Use of encryption technology to protect inactive data is referred to herein as "storage encryption," and may include the use of encryption/decryption of backed-up and/or archived data, in transit and/or on storage media. Storage encryption may be desirable as a feature of storage security in storage area networks (SANs), for example. Certain embodiments disclosed herein provide data storage devices configured to support multiple encryption models, such as file-based encryption, raw data encryption, and/or other variations. In certain embodiments, such encryption flexibility is embodied in a controller chip in a data storage device, such as in a single SSD controller chip.

FIG. 1 shows an exemplary block diagram 100 of a storage device 102 which communicates with a host device 104 (also "host") according to an exemplary embodiment. The host device 104 and the storage device 102 may form a system, such as a computer system (e.g., server, desktop, mobile/laptop, tablet, smartphone, etc.). The components of FIG. 1 may or may not be physically co-located. In this regard, the host device 104 may be located remotely from storage device 102. Although FIG. 1 illustrates that the host device 104 is shown separate from the storage device 102, the host device 104 in other embodiments may be integrated into the storage device 102, in whole or in part. Alternatively, the host device 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host device 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host device 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host device 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host device 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
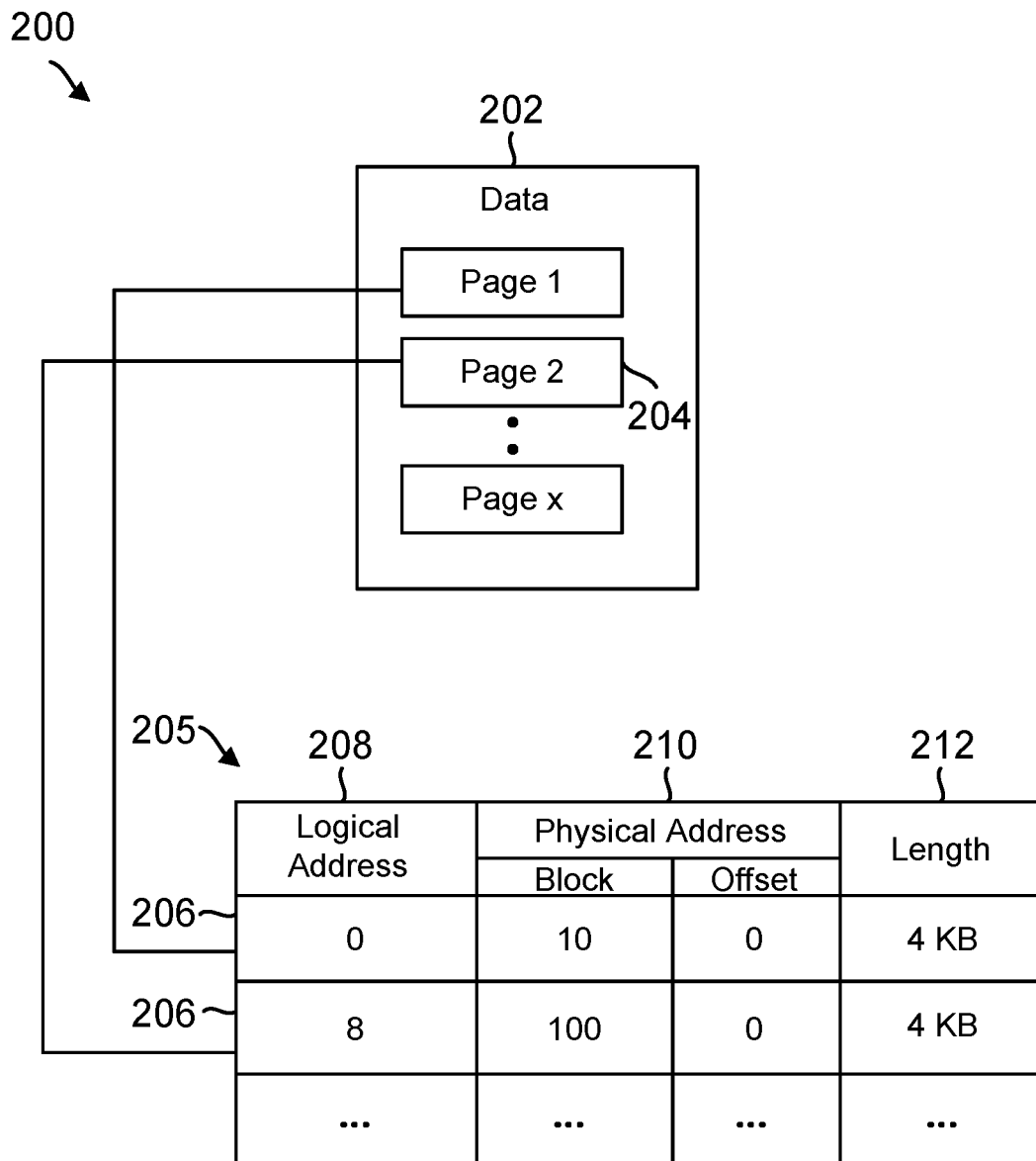
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host device 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an ASIC, a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The host interface 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host device 104 may retrieve data from the storage device 102 by sending a read command specifying one or more logical addresses associated with the data to be retrieved from the storage device 102, as well as a length of the data to be read. The host interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host device 104 via the host interface 106.

Figure 3:
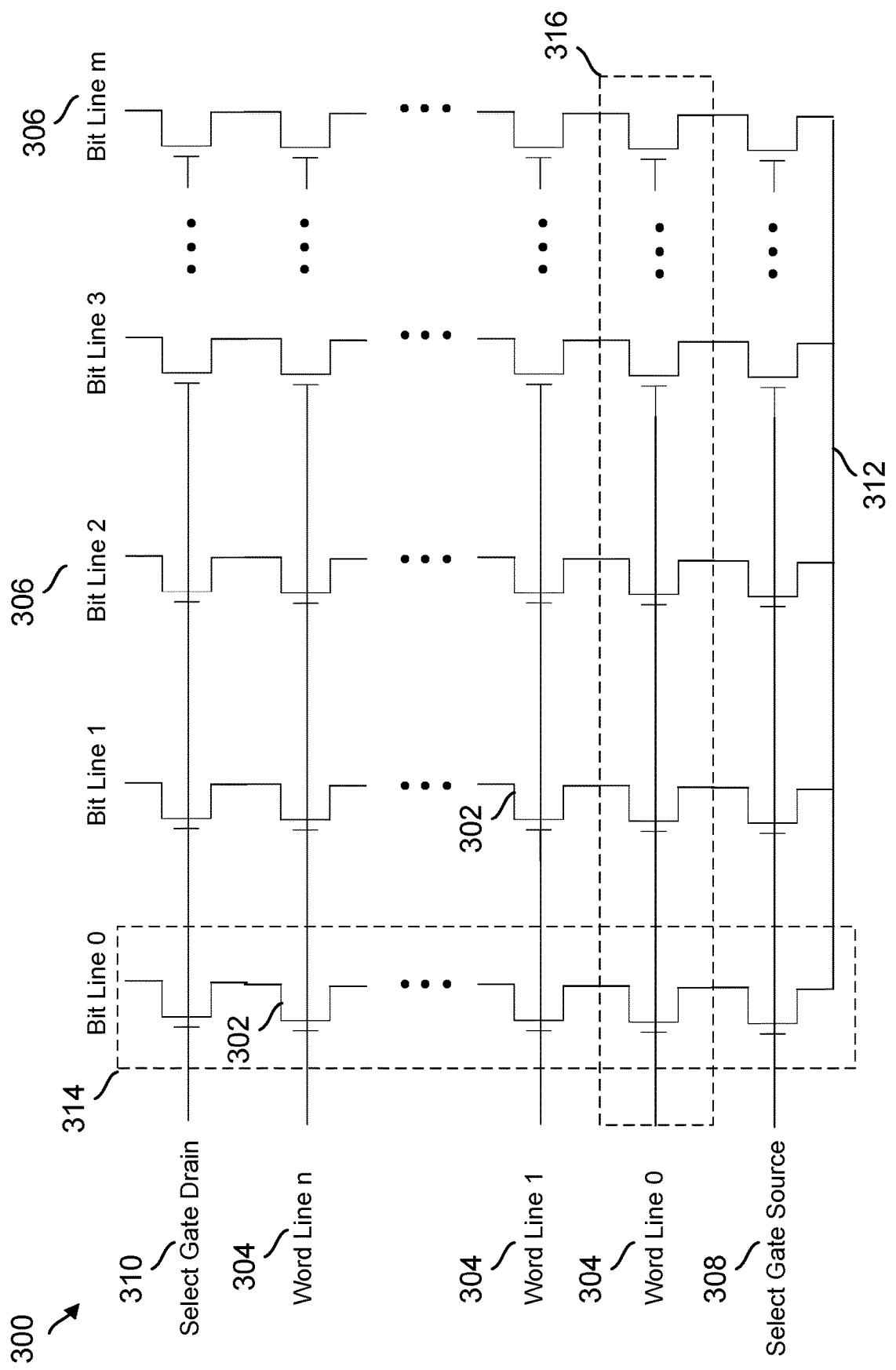
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and in bit lines within a block of a die 114 of the NVM 110, where n and in are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302

(including SGS and SGD cells 308, 310) coupled to one bit line within a block, while a page 316 may include a group of cells 302 coupled to one word line within the block.

Figure 4:
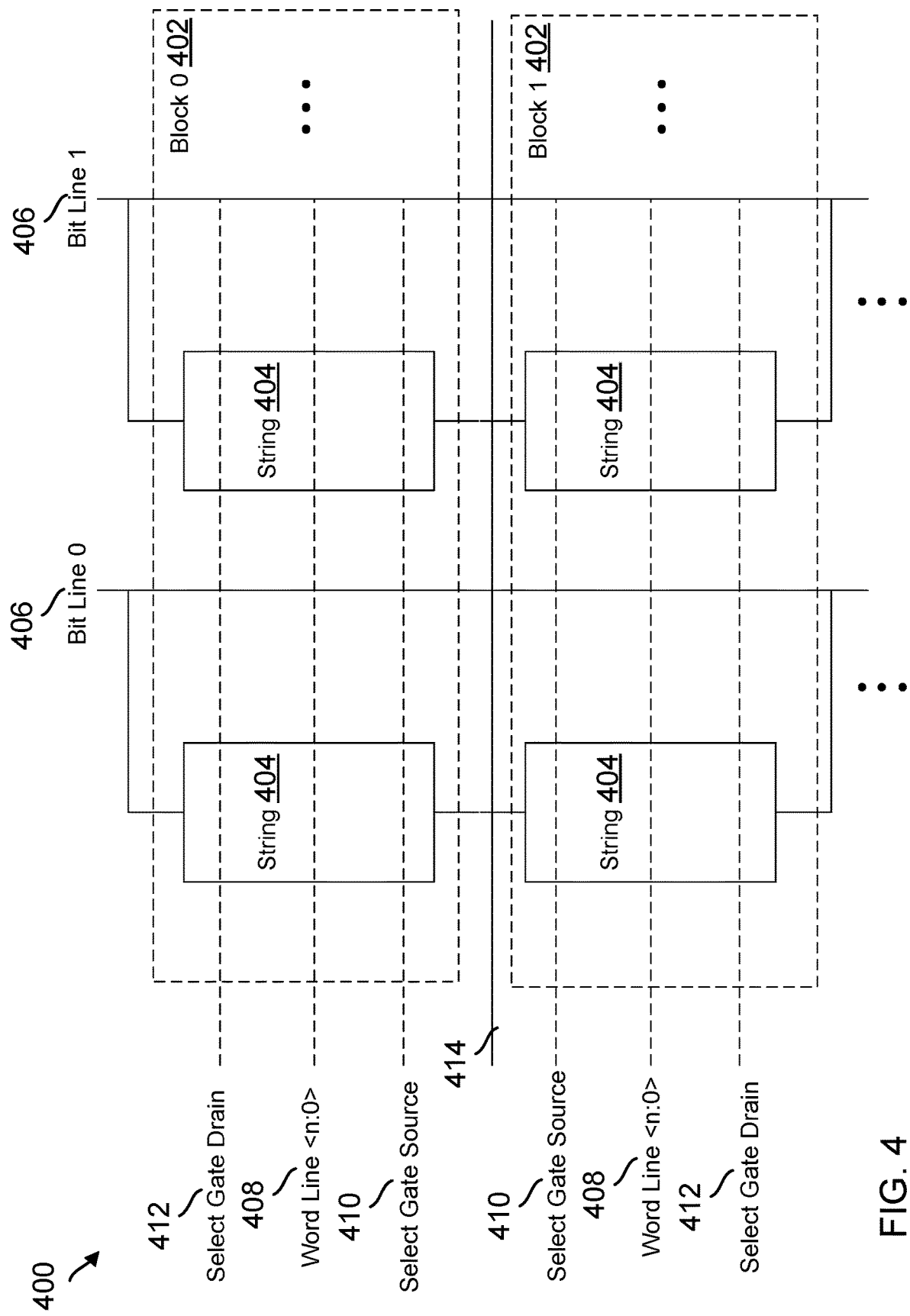
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1' while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
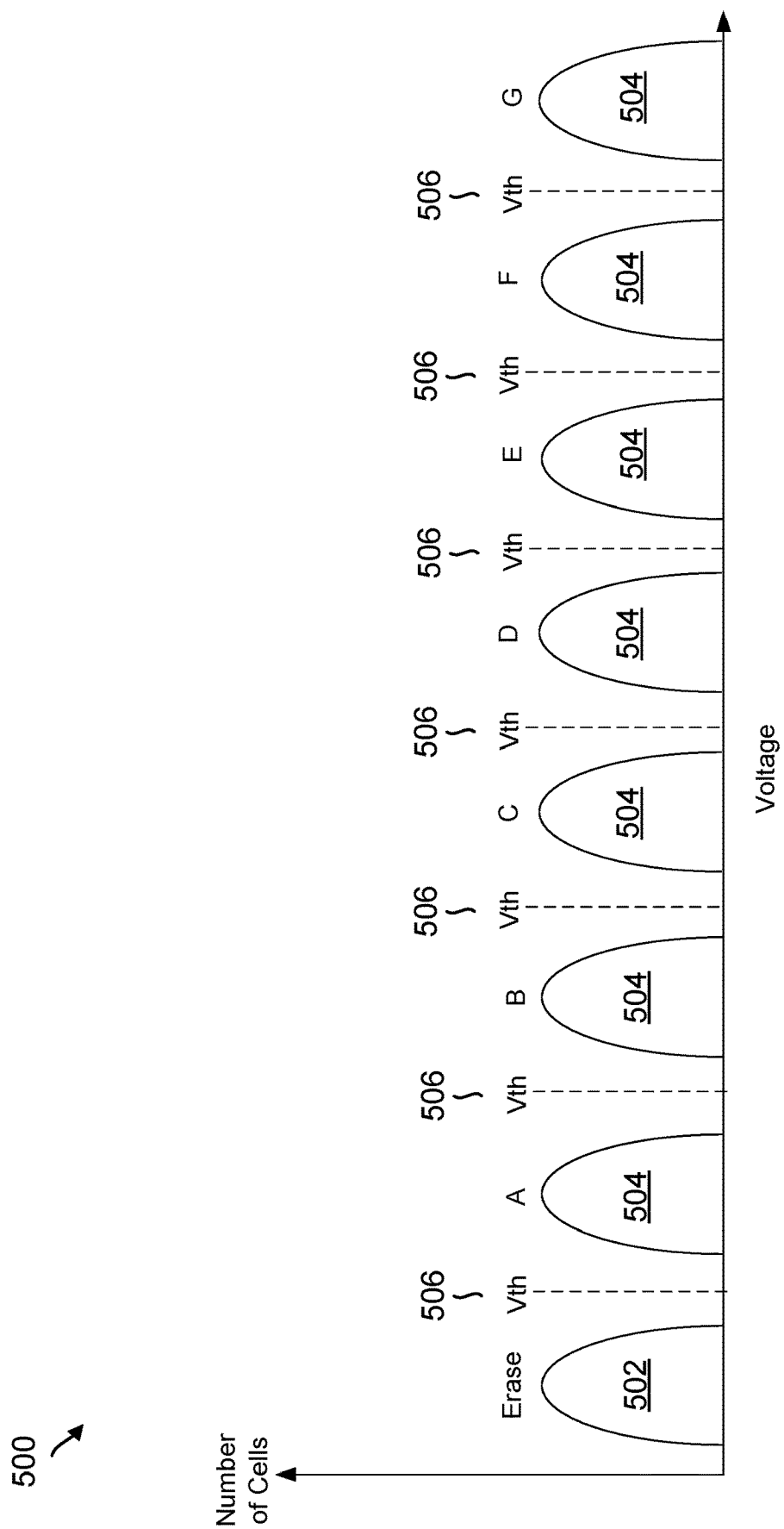
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

When the controller 123 attempts to program cells 116, 302 of a selected word line 304, 408 into one of the program states 504, the controller may perform incremental step pulse programming (ISPP) over a number of programming loops or ISPP cycles. For example, a programming voltage (e.g. a high voltage) may be applied to the selected word line 304, 408, a pass through voltage (e.g. a high voltage lower than the programming voltage) may be applied to the other word lines 304, 408, a bit line program voltage (e.g. a low voltage) may be applied on the bit lines 306, 406 connected to the selected cells being programmed on the selected word line, and a bit line inhibit voltage (e.g. a high voltage) may be applied on the bit lines 306, 406 connected to the other cells not being programmed on the selected word line. Applying a high programming voltage to the selected word line and a low voltage to the selected bit lines allows electrons to tunnel from the channel into the charge trapping layer of those selected cells, thereby causing the threshold voltage of the cells to increase. On the other hand, applying a high voltage to unselected bit lines inhibits electrons from tunneling from the channel into the charge trapping layer of those unselected cells, thereby preventing the threshold voltage of those cells from increasing. Thus, bit lines coupled to cells programmed to lower states may be inhibited to prevent the threshold voltage of those cells from increasing while other cells are programmed to higher states. For instance, in the case of TLCs, the bit lines of cells that are first programmed into the A state may be inhibited first, followed by the bit lines of different cells that are programmed into the B state, followed by those that reach the C state, then the D state, and so forth until the remaining cells on the selected word line ultimately reach the G state and all cells on the selected word line have been programmed.

After the programming voltage is applied in one programming loop or ISPP cycle, a program verify voltage (e.g. a low voltage) may be applied to the word line 304, 408 to determine whether the threshold voltage of a cell has increased beyond a respective threshold voltage into an intended program state. If none of the cells have transitioned into an intended programming state, then another programming loop or ISPP cycle is performed in which a higher programming voltage may be applied to further increase the threshold voltage of the cells. Subsequently, a program verify voltage may again be applied to determine whether the threshold voltage of a cell has transitioned into an intended program state. The above process of incrementally increasing the programming voltage and verifying the voltage threshold of the selected cells may be repeated over a number of programming loops. If the cells transition into their respective programming states and the total number of programming loops does not exceed a predetermined loop count, the controller may determine that the cells have entered their intended program states and are thus successfully programmed. Otherwise, if the total number of programming loops exceeds the predetermined loop count before the cells transition into their respective programming states, the controller may determine that a program failure has occurred.

Figure 6:
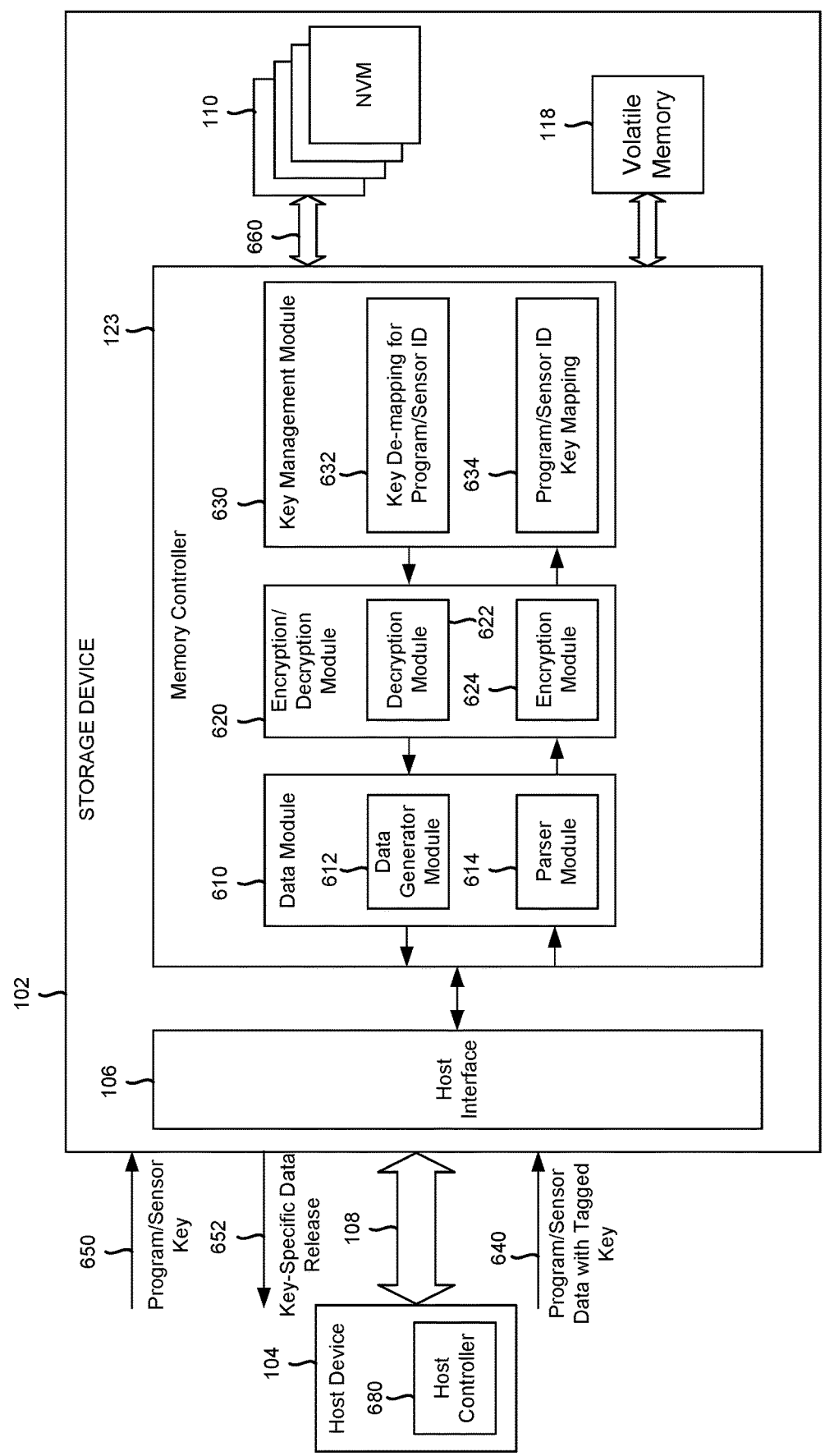
FIG. 6 is a conceptual diagram illustrating an example of a non-volatile memory system in the storage device of FIG. 1 which communicates with a host device.

FIG. 6 is a block diagram of example non-volatile memory system in the storage device of FIG. 1, depicting more details of one exemplary embodiment of a memory controller 123 and a host device 104. In one exemplary embodiment, the system of FIG. 6 is a SSD. As used herein, the memory controller 123 is a device that manages data stored on a non-volatile memory device and communicates with the host device 104, such as a computer or electronic device. In some exemplary embodiments, the non-volatile memory 110 contains flash (e.g., NAND, NOR) memory cells, in which case the memory controller 123 may be a flash memory controller.

The memory controller 123 can have various functionality in addition to the specific functionality described herein. For example, the memory controller can format the memory to ensure the memory is operating properly, map out bad memory cells, and allocate spare memory cells to be substituted for future failed cells. Some part of the spare cells can be used to hold firmware to operate the memory controller and implement other features. In operation, when the host device 104 needs to read data from or write data to the memory, it can communicate with the memory controller 123. If the host device 104 provides a logical address (LA) to which data is to be read/written, the memory controller 123 can convert the logical address received from the host device 104 to a physical address in the memory. The logical address may be a LBA, and the physical address may be a physical block address (PBA). (Alternatively, the host device 104 can provide the physical address). The memory controller 123 can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The host device 104 may communicate with the memory controller 123 over the host interface 106 (in FIG. 1). The storage device interface 6118 may include a physical layer interface (PHY) that provides an electrical interface with the storage device 102 and/or the host interface 106. In one exemplary embodiment, PHY includes hardware that is compliant with PCIe. However, PHY is not limited to PCIe. The storage device interface typically facilitates transfer for data, control signals, and timing signals over the host interface 106.

The memory controller 123 may be configured to implement a memory access protocol, such as an Non-Volatile Memory Express (NVMe) protocol. A memory controller 123 that implements an NVMe protocol is referred to herein as an NVMe memory controller. Likewise, a host controller 680 that implements an NVMe protocol is referred to herein as an NVMe host controller.

The host device 104 has a host controller 680. The host controller 680, as the term is used herein, is a device that communicates with the memory controller 123 in order to access non-volatile memory, which is under the control of the memory controller 123. Host controller 680 may be configured to implement host controller functions of a memory access protocol, including but not limited to NVMe. Note that host controller 680 may be configured to implement techniques which may be extensions to a memory access protocol such as NVMe.

The host controller 680 may communicate with the memory controller 123 over the host interface 106 (in FIG. 1). The storage device interface 6'18 may include a physical layer interface (PHY) that provides an electrical interface with the storage device 102 and/or the host interface 106. In one exemplary embodiment, PHY includes hardware that is compliant with PCIe. However, PHY is not limited to PCIe. The storage device interface typically facilitates transfer for data, control signals, and timing signals over the host interface 106.

The memory controller 123 may interface with the NVM 110. In one exemplary embodiment, the memory controller 123 and multiple memory dies (together comprising the storage device 102) implement a SSD, which can emulate, replace or be used instead of a hard disk drive inside a host, as a NAS device, etc. Additionally, the SSD need not be made to work as a hard drive.

In some exemplary embodiments, the storage device 102 includes a single channel between the memory controller 123 and non-volatile memory 110, although the subject matter described herein is not limited to having a single memory channel. For example, in some non-volatile memory device architectures, 4, 6, 8 or more channels may exist between the memory controller 123 and the memory dies, depending on memory controller capabilities. In any of the exemplary embodiments described herein, more than a single channel may exist between the memory controller and the memory dies, even if a single channel is shown in the drawings.

The memory controller 123 includes a host interface 106 that provides the electrical interface with the host device 104 or a next level storage memory controller. The host interface 106 may include a PHY. In one exemplary embodiment, host interface 106 includes hardware that is compliant with PCIe. However, host interface 106 is not limited to PCIe. The host interface 106 typically facilitates transfer for data, control signals, and timing signals. The host interface may be configured to configured to provide communication with the host device 104.

The memory controller 123 may include a memory interface that provides the command sequences to non-volatile memory 110 and receives status information from non-volatile memory 110. The memory interface may be configured to access non-volatile memory on the non-volatile memory 110. The memory interface may provide an electrical connection to lines 660. The memory interface may control timing of signals over lines 660 to non-volatile memory 110. In one exemplary embodiment, the memory interface may be a double data rate (DDR) interface. In some exemplary embodiments, the memory interface is a flash memory interface. However, the memory cells in non-volatile memory 110 are not limited to flash memory. Hence, the memory interface is not limited to a flash memory interface.

The components of memory controller 123 depicted in FIG. 6 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, all or a portion of each module (including, but not limited to, host interface 106) may include an ASIC, a FPGA, a circuit, a digital logic circuit, an analog circuit, a combination of discrete circuits, gates, or any other type of hardware or combination thereof. Alternatively or in addition, all or a portion of each module may include or comprise software stored in a processor readable device (e.g., memory) to program a one or more processors for memory controller 123 to perform the functions described herein. The architecture depicted in FIG. 6 is one exemplary embodiment that may (or may not) use the components of the memory controller 123.

The memory controller 123 may receive data and storage access commands from the host interface 106 communicatively coupled to the host device 104. Storage access commands communicated by the host interface 106 may include write and read commands issued by the host device 104. The storage access commands may specify a sub-stream identifier along with an encryption key, and the memory controller 123 may execute the received storage access commands in the NVM 110.

The storage device 102 may store data received from the host device 104, such that the storage device 102 can act as memory for the host device 104. To facilitate this memory function, the memory controller 123 may implement a logical interface. The logical interface may present to the host controller 680 the memory of the storage device 102 as a set of logical addresses (e.g., contiguous address) where data can be stored. The memory controller 123 may map logical addresses to various physical memory addresses in the NVM 110 and/or other memory module(s).

The storage device 102 may be configured to encrypt host data using encryption keys and store the host data in the NVM 110. Key management, including generation, exchange, storage, usage, and/or replacement of keys, and/or key scheduling, may be performed at least in part by the memory controller 123 and/or other illustrated components of the storage device 102. The storage device 102 and/or memory controller 123 may be configured to maintain key configuration data corresponding to ranges of sub-stream identifiers of associated host data streams stored in the NVM 110.

In order to provide key-based data segregation and encryption, the storage device 102 may implement a mechanism for identifying which portions of a data stream pertain to a received encryption key when an instruction is received from the host device 104.

For example, one or more parameters of the host command may be checked to determine what key is to be used. In certain embodiments, the storage device 102 is configured to generate and/or maintain one or more media encryption keys associated with a sub-stream identifier, or a range of sub-stream identifiers. Therefore, sub-stream identifier from the host command may be relied upon to determine the appropriate data stream portion to segregate and encrypt.

The storage device 102 may utilize different types of keys, and may use multiple keys. For example, the storage device 102 may utilize symmetric keys and/or asymmetric keys. In certain embodiments, encryption keys are 128 or 256 bit Advanced Encryption Standard (AES) keys.

In certain embodiments, the storage device 102 may include a data module 610. The data module 610 may include a data generator module 612 configured to generate data from decrypted data along a read path (or data retrieval path) of the storage device 102. The data module 610 also includes a parser module 614 configured to parse (or segregate) incoming host data into multiple portions along a write path (or data storage path) of the storage device 102 based on corresponding sub-stream identifiers that respectively identify associated programs or sensors of the host device 104.

In certain embodiments, the storage device 102 may include an encryption/decryption module 620. The encryption/decryption module 620 may be configured to perform encryption of host data to be stored in at least a portion of the NVM 110 and/or decryption of data that is stored in at least a portion of the NVM 110. In one example embodiment, the encryption/decryption module 620 is configured to encrypt/decrypt data according to one or more keys selected on a per-command basis.

In certain embodiments, the storage device 102 may include a key management module 630 that manages and provides encryption keys to the encryption/decryption module 620 in response to data extracted from host I/O commands. In certain embodiments, the memory controller 123 may perform at least a portion of the functions of the encryption/decryption module 620 and/or the key management module 630. The key management module 630 includes a key mapping module 634 that can map a received encryption key with a corresponding sub-stream identifier associated with one or more data stream portions to be stored in at least a portion of the NVM 110. The key management module 630 also includes a key de-mapping module 632 that can reverse map a received token (or encryption key) with an encoded sub-stream identifier associated with an encoded data stream portion stored in at least a portion of the NVM 110.

As discussed above, traditional storage systems that support encryption mechanisms to protect data require the entire data to be retrieved from the storage device. Such an approach not only increases data transfers, but also places unnecessary data (or non-requested data) that transfers between the storage device and the consumer (e.g., the host device) at risk. To secure data stored in legacy storage devices, encryption based on an encryption key may be maintained at a logical group. However, these legacy storage systems can treat all data as a single entity, which can result in suboptimal performance and unsecured retrieval mechanisms.

The present disclosure provides a mechanism in key-based segregation, encryption and storage of data. In this regard, the storage device 102 can utilize different encryption keys provided by a requesting producer entity (e.g., the host device 104) to protect different programs (or different types of sensor data) available in a data stream prior to data storage. In some aspects, data-intensive applications that run on the host device 104 can generate significant amounts of data from multiple sensors physically coupled (or communicatively coupled) to the host device 104, and different sensor data may be analyzed by different entities. For example, data from multiple sensors can be stored in an autonomous vehicle by way of storing in the storage device

102. For example, multiple sensor data (from various sensor IDs, such as LIDAR, RADAR, GPS, AV capture) are routed to one or more streams in the NVMe system. In other examples, multiple programs (e.g., AV captures in an autonomous vehicle) from multiple junctions can be received at the storage device 102 as a single MPEG transport stream. Each sensor ID may represent independent data, but may be routed to a same namespace (e.g., a group of logical block addresses) or different namespace. As such, different entities attempting to access the data for analysis may not have permission to access all the stored data. Encrypting the program in the storage device 102 can ensure that only that requesting consumer entity with the same encryption key has access to the requested data. Although the data can be stored together in a same logical block (or at contiguous memory locations), specified keys associated with different sensors can be used to segregate the incoming data on the encryption path (or write path) and restrict access to segregated data portions that are not requested by a requesting consumer entity or are non-matching with a key provided by the requesting consumer entity on the decryption path (or read path). This can be useful to increase data security in storage systems since the storage associated with autonomous vehicles can provide only certain sensor data (e.g., GPS data), but not provide other types of sensor data (e.g., AV recording), although they are stored in a same backend stream in a same Namespace from a same host device (e.g., producer entity).

During a data access request from a requesting consumer entity (e.g., the host device 104), the storage device 102 can reverse map a received encryption key from an encryption key mapping table (e.g., the key management module 630), and decrypt a protected identifier associated with the requested transport data (e.g., sensor ID/program ID) alone using a matching encryption key, and further send only a portion of the transport data (e.g., specific application data) for which the program ID/sensor ID matches with the received encryption key. Such program ID/sensor ID based encryption enables the storage device 102 to restrict unwanted data at the beginning of the system chain itself, thereby securing the non-requested data while reducing the amount of latency in securing any necessary data. The key-based data segregation and encryption also allows the storage device 102 to reduce processing resources needed to protect any specified data and increase the security of other protected data unassociated with a memory access request. The process of key sharing or predetermined key usage between the requesting producer entity and the requesting consumer entity is outside the scope of the present disclosure.

The memory controller 123 can receive a data stream from the host device 104. The data stream may indicate a plurality of encryption keys associated with the data stream (e.g., 640). For example, the encryption key is tagged to the data stream by way of tagging a respective payload of the data stream with metadata that is representative of the encryption key, which is then written in the storage device 102 (e.g., NVM 110). The storage device 102 can utilize the tagged encryption key to encrypt different programs/sensor data available in the input data stream. In some aspects, the memory controller 123, through coordination with the parser module 614, can segregate the data stream into a plurality of data stream portions based on the tagged encryption keys. For example, the data stream may include a first sub-stream tagged with a first encryption key, a second sub-stream tagged with a second encryption key and a third sub-stream tagged with a third encryption key, such that the parser module 614 can segregate the data stream into three individual portions based on the corresponding tagged encryption keys. In this regard, the memory controller 123 can encode the plurality of data stream portions into a plurality of encoded data stream portions with the plurality of encryption keys. For example, the encryption module 624 can encode the first sub-stream with the first encryption key, encode the second sub-stream with the second encryption key and encode the third sub-stream with the third encryption key, where each data stream portion can be encoded independent of the other sub-streams having associated encryption keys.

In some aspects, an application running (e.g., a requesting producer entity) on the host device 104 can generate the key for each program or a group of programs. In other aspects, the storage device 102 can generate the encryption key. For example, the memory controller 123, through coordination with the key management module 630, can generate the encryption key. In some aspects, the data stream includes a plurality of encryption key identifiers that respectively correspond to the plurality of encryption keys. In some aspects, the memory controller 123 may generate the plurality of encryption keys based on the plurality of sub-stream identifiers and the plurality of encryption key identifiers. Alternatively, the requesting producer entity (e.g., the host device) can encrypt the programs (or sensor data) so long as the associated encryption keys are provided to the storage device 102 to facilitate decryption of requested data during data retrieval. For example, the host device 104 can supply the encryption keys used to encrypt the data at the host side by tagging the encryption keys to one or more payloads of a data stream as metadata. In some aspects, the encrypted data received at the storage device 102 can be passed to the key mapping module 634 while bypassing the parser module 614 and/or the encryption module 624.

In some aspects, the data stream includes a plurality of sub-stream identifiers corresponding to different programs associated with the host device 104. For example, each of the plurality of data stream portions is associated with a different sub-stream identifier of the plurality of sub-stream identifiers. In some aspects, each of the plurality of encryption keys may be associated with one or more of the plurality of sub-stream identifiers.

In addition, the memory controller 123 can manage the mapping and storage of the encryption keys within data structures of the NVM 110. For example, the storage device 102 can maintain an encryption key mapping table (e.g., program key mapping table, sensor key mapping table) to restrict common access of protected data. For example, the key management module 630 may manage the mapping of the encryption keys with corresponding sub-stream identifiers and the storage of the encryption keys in the NVM 110. The encryption keys can be mapped against different sensors and/or programs in different data streams. In some aspects, the memory controller 123, through coordination with the key management module 630, can generate a mapping indicating an association between each of the plurality of encryption keys with a respective one of the plurality of encoded data stream portions. In some aspects, the mapping further indicates an association between each of the plurality of encryption keys with respective ones of the plurality of sub-stream identifiers. For example, the mapping indicates a first set of logical addresses to the memory (e.g., NVM 110) for the plurality of sub-stream identifiers. In some aspects, each of the plurality of encoded data stream portions is stored at a location in the NVM 110 that corresponds to a logical address of an associated sub-stream identifier within the first set of logical addresses. In another example, the mapping indicates a second set of logical addresses to the NVM 110 for the plurality of encryption keys. In some aspects, each of the plurality of encryption keys is stored at a location in the NVM 110 that corresponds to a logical address within the second set of logical addresses. In one or more embodiments, the storage device 102 can store the plurality of encoded data stream portions and the plurality of encryption keys in the memory (e.g., NVM 110) based on the mapping. In some aspects, the mapping indicates an association between the first set of logical addresses and the second set of logical addresses. For example, the mapping may associate the encryption keys with the sub-stream identifiers such that the physical memory location of an encoded data stream portion can be identified by the logical address of a sub-stream identifier and/or encryption key.

During a data retrieval request, the memory controller 123 may receive a request to access encoded data stored in the memory from a requesting consumer entity (e.g., the host device 104). For example, the host device 104 can send an encryption key as a token (e.g., 650). In some aspects, the storage device can map the received encryption key in the token against existing encryption keys. In this regard, the memory controller 123, through coordination with the key de-mapping module 632 in the key management module 630, can determine a matching encryption key that corresponds to the token from a plurality of encryption keys stored in a data structure of the NVM 110. For example, the key de-mapping module 632 may compare the input encryption key against the plurality of encryption keys indicated in a mapping (e.g., maintained by the key de-mapping module 632) to determine the matching encryption key.

With a matching encryption key, the storage device can determine the corresponding program ID (or sensor ID) and associated data stream portions (e.g., video and multiple audio counterparts). In some aspects, the storage device 102 can determine a sub-stream identifier corresponding to the requested encoded data that is associated with the matching encryption key based on a mapping between the plurality of encryption keys and respective ones of a plurality of sub-stream identifiers. For example, the memory controller 123, through coordination with the decryption module 622, can determine the program ID by decrypting an encoded version of the program ID stored in the storage device 102 using the matching encryption key.

The memory controller 123 can obtain one or more encoded data stream portions that correspond to the sub-stream identifier, from an encoded data stream stored in the NVM 110. In some aspects, the encoded data stream includes a plurality of encoded data stream portions that correspond to different sub-stream identifiers associated with different encryption keys. For example, the memory controller 123 may identify which of the plurality of encoded data stream portions are associated with the matching encryption key.

The memory controller 123 can decode the corresponding data stream portions. For example, the memory controller 123, through coordination with the decryption module 622, can decrypt the one or more encoded data stream portions with the matching encryption key into respective decoded data stream portions. In addition, the memory controller 123, through coordination with the data generator module 612, can generate a transport data stream that contains only the decoded data stream portions that pertain to the programs or sensor data associated with the encryption key. In some aspects, the storage device 102 sends the decoded data to the requesting consumer entity (or requesting application) running on the host device 104. For example, the storage device 102 can send the respective decoded data stream portions to the host device 104 in response to the request (e.g., 652). In this regard, the storage device 102 can provide only certain sensor data (e.g., GPS data), but not provide other types of sensor data (e.g., AV recording), although the two different types of sensor data can be stored in a same backend stream in a same Namespace from a same host (e.g., the host device 104).

Although the present disclosure discusses the aforementioned examples for sensors and programs, the subject technology is applicable to other data types as well. The subject technology aims at providing a portion of protected data whichever matches an encryption key.

Figure 7:
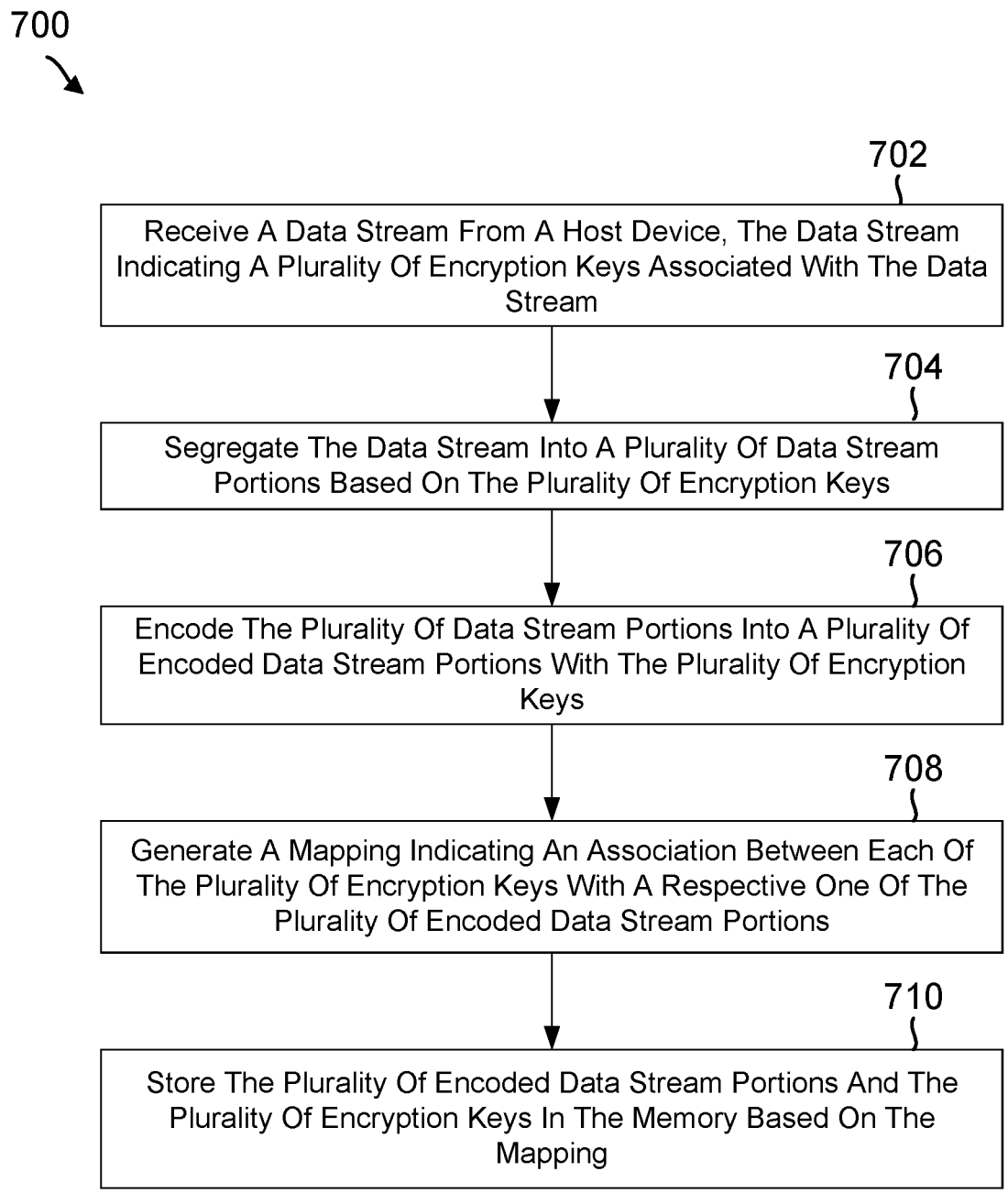
FIG. 7 is a flow chart illustrating an example process of key based partial data encryption, as performed by the storage device of FIG. 1.

FIG. 7 is a flow chart illustrating an example process 700 of key based partial data encryption. For example, the process 700 can be carried out in a storage device 102 such as the one illustrated in FIG. 1. Each of the steps in the flow chart can be controlled using the controller as described below (e.g. controller 123), by a component or module of the controller, or by some other suitable means.

As represented by block 702, the controller may receive a data stream from a host device. In some aspects, the data stream indicates a plurality of encryption keys associated with the data stream. In some aspects, the controller may receive the plurality of encryption keys from the host device. The plurality of encryption keys may be tagged in respective payloads of the data stream. For example, as illustrated in FIG. 6, the controller may receive program/sensor data with tagged encryption keys (e.g., 640). In some aspects, the data stream includes a plurality of sub-stream identifiers corresponding to different programs associated with the host device. In some aspects, each of the plurality of encryption keys is associated with one or more of the plurality of sub-stream identifiers. In some aspects, the data stream includes a plurality of encryption key identifiers that respectively correspond to the plurality of encryption keys. In some aspects, the controller may generate the plurality of encryption keys based on the plurality of sub-stream identifiers and the plurality of encryption key identifiers.

As represented by block 704, the controller may segregate the data stream into a plurality of data stream portions based on the plurality of encryption keys. For example, referring to FIG. 6, the controller may segregate the data stream through the parser module 614. In some aspects, each of the plurality of data stream portions is associated with a different sub-stream identifier of the plurality of sub-stream identifiers. In some aspects, wherein the plurality of data stream portions comprises a first data stream portion associated with a first sub-stream identifier that corresponds to a first program of the host device and a second data stream portion associated with a second sub-stream identifier that corresponds to a second program of the host device. For example, the controller may encode the first data stream portion with a first encryption key of the plurality of encryption keys that is associated with the first sub-stream identifier into a first encoded data stream portion and encode the second data stream portion with a second encryption key of the plurality of encryption keys that is associated with the second sub-stream identifier into a second encoded data stream portion. In one or more implementations, the first encoded data stream portion and the second encoded data stream portion are stored sequentially in a same logical block. In other implementations, the first encoded data stream portion is stored in a first logical block associated with the first sub-stream identifier and the second encoded data stream portion is stored in a second logical block different than the first logical block that is associated with the second sub-stream identifier.

As represented by block 706, the controller may encode the plurality of data stream portions into a plurality of encoded data stream portions with the plurality of encryption keys. For instance, referring to FIG. 6, the controller may encode the segregated data stream portions through the encryption module 624 based on an associated encryption key. For instance, the encryption module 624 may encrypt each data stream portion with the associated encryption key such that data retrieval of stored data may be limited to entities having a matching encryption key to the encrypted data stream portion.

As represented by block 708, the controller may generate a mapping indicating an association between each of the plurality of encryption keys with a respective one of the plurality of encoded data stream portions. For example, the mapping may indicate an association between each of the plurality of encryption keys with respective ones of the plurality of sub-stream identifiers. For instance, referring to FIG. 6, the memory controller 123, through coordination with the key mapping module 634, may generate the mapping between encryption keys and data stream portions by way of associating each encryption key with a corresponding sub-stream identifiers or a group of sub-stream identifiers depending on implementation. In some aspects, the mapping indicates a first set of logical addresses to the memory for the plurality of sub-stream identifiers. In some aspects, each of the plurality of encoded data stream portions is stored at a location in the memory that corresponds to a logical address of an associated sub-stream identifier within the first set of logical addresses. In other aspects, the mapping indicates a second set of logical addresses to the memory for the plurality of encryption keys. In some aspects, each of the plurality of encryption keys is stored at a location in the memory that corresponds to a logical address within the second set of logical addresses. In some aspects, the mapping indicates an association between the first set of logical addresses and the second set of logical addresses.

As represented by block 710, the controller may store the plurality of encoded data stream portions and the plurality of encryption keys in the memory based on the mapping. For instance, referring to FIG. 6, the memory controller 123 may store the individual encoded data stream portions in at least a portion of the NVM 110.

Figure 8:
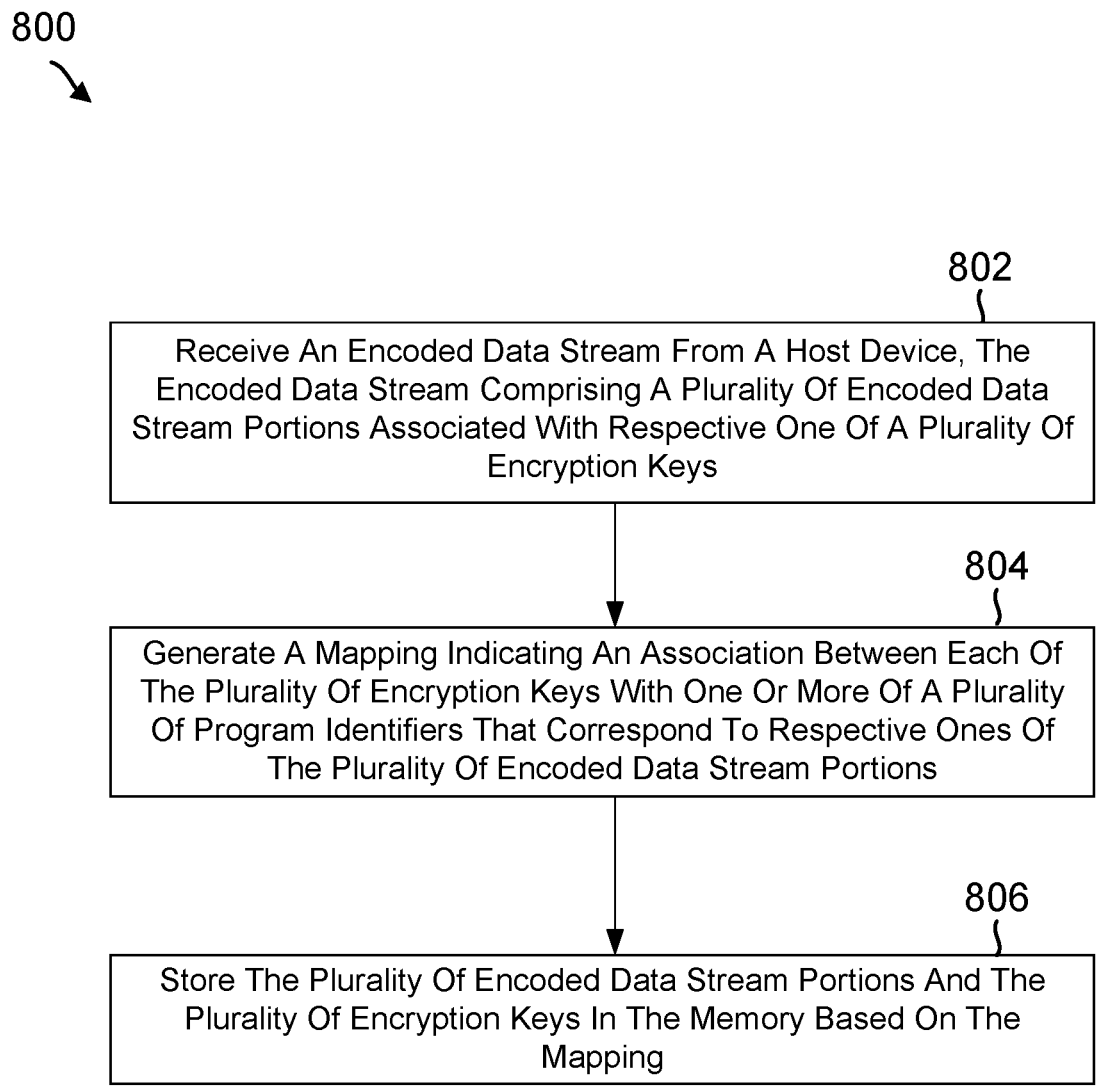
FIG. 8 is a flow chart illustrating another example process of key based partial data encryption, as performed by the storage device of FIG. 1.

FIG. 8 is a flow chart illustrating an example process 800 of key based partial data encryption. For example, the process 800 can be carried out in a storage device 102 such as the one illustrated in FIG. 1. Each of the steps in the flow chart can be controlled using the controller as described below (e.g. controller 123), by a component or module of the controller, or by some other suitable means.

As represented by block 802, the controller may receive an encoded data stream from a host device. In some aspects, the encoded data stream includes a plurality of encoded data stream portions associated with respective ones of a plurality of encryption keys. For example, referring to FIG. 6, the controller 123 may receive the encoded data and pass directly to the key mapping module 634. In some aspects, the controller may receive the plurality of encryption keys from the host device. For example, referring to FIG. 6, the controller 123 may receive the encryption keys along with the encoded data (e.g., 640). In other aspects, the controller 123 may receive the encryption keys separately from the encoded data by way of a control signal via the host interface 106.

As represented by block 804, the controller may generate a mapping indicating an association between each of the plurality of encryption keys with one or more of a plurality of sub-stream identifiers that correspond to respective ones of the plurality of encoded data stream portions. For instance, referring to FIG. 6, the memory controller 123, through coordination with the key mapping module 634, may generate the mapping between encryption keys and encoded data stream portions by way of associating each encryption key with a corresponding sub-stream identifiers or a group of sub-stream identifiers depending on implementation. In some aspects, each of the plurality of encoded data stream portions is associated with a different sub-stream identifier of the plurality of sub-stream identifiers. In some aspects, the mapping further indicates an association between each of the plurality of encryption keys with respective ones of the plurality of sub-stream identifiers. In some aspects, the mapping indicates a first set of logical addresses to the memory for the plurality of sub-stream identifiers, wherein each of the plurality of encoded data stream portions is stored at a location in the memory that corresponds to a logical address of an associated sub-stream identifier within the first set of logical addresses. In some aspects, the mapping indicates a second set of logical addresses to the memory for the plurality of encryption keys, wherein each of the plurality of encryption keys is stored at a location in the memory that corresponds to a logical address within the second set of logical addresses, and wherein the mapping indicates an association between the first set of logical addresses and the second set of logical addresses.

As represented by block 806, the controller may store the plurality of encoded data stream portions and the plurality of encryption keys in the memory based on the mapping. For instance, referring to FIG. 6, the memory controller 123 may store the individual encoded data stream portions in at least a portion of the NVM 110.

Figure 9:
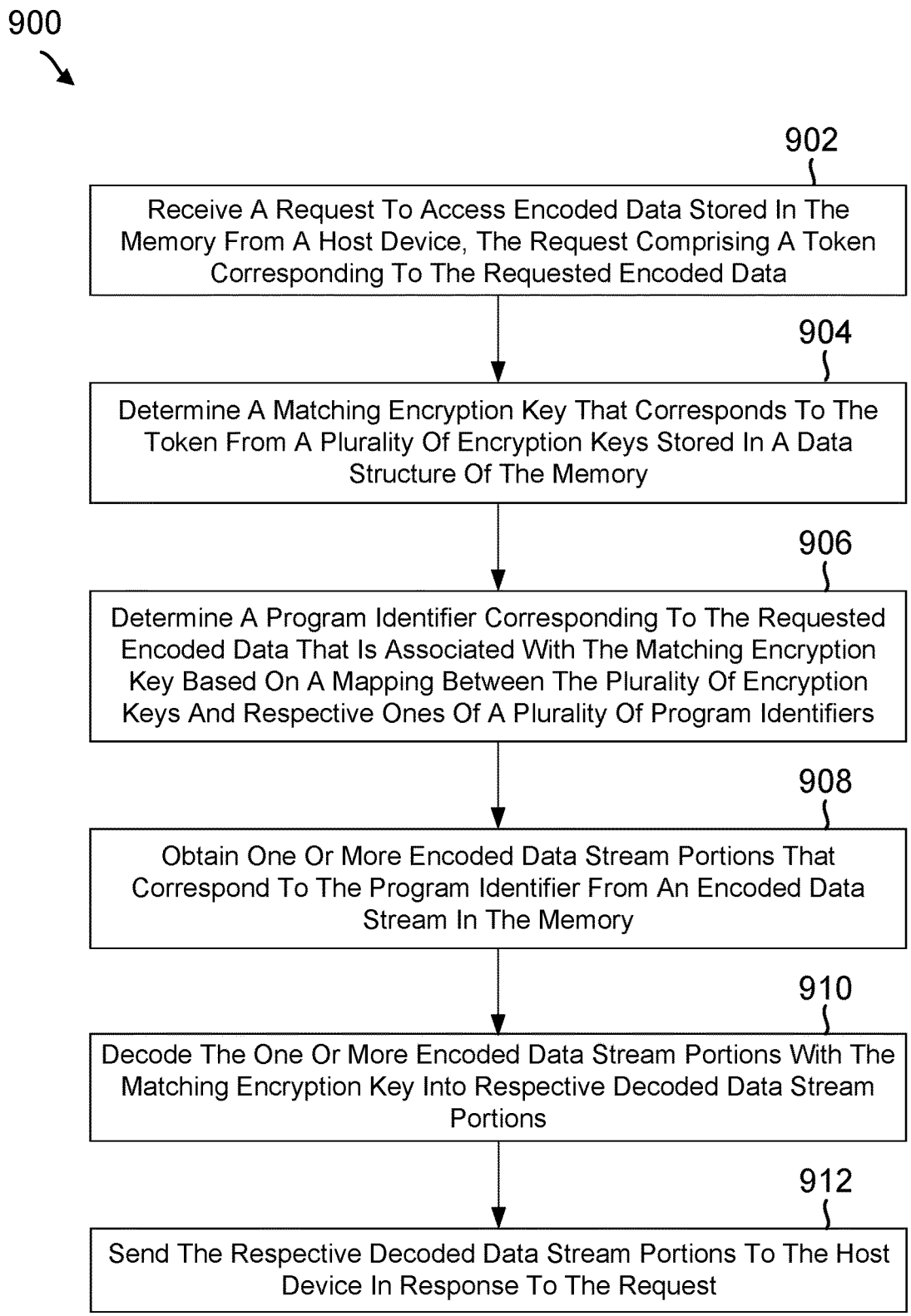
FIG. 9 is a flow chart illustrating an example process of key based partial data decryption, as performed by the storage device of FIG. 1.

FIG. 9 is a flow chart illustrating an example process 900 of key based partial data decryption. For example, the method can be carried out in a storage device 102 such as the one illustrated in FIG. 1. Each of the steps in the flow chart can be controlled using the controller as described below (e.g. controller 123), by a component or module of the controller, or by some other suitable means.

As represented by block 902, the controller may receive a request to access encoded data stored in the memory from a host device. In some aspects, the request includes a token corresponding to the requested encoded data. For example, referring to FIG. 6, the controller 123 may receive the request along with the program/sensor key 650 via the host interface 106.

As represented by block 904, the controller may determine a matching encryption key that corresponds to the token from a plurality of encryption keys stored in a data structure of the memory. In some aspects, the token indicates an input encryption key from the host device. In one or more implementations, the controller may compare the input encryption key against the plurality of encryption keys indicated in the mapping to determine the matching encryption key. For example, referring to FIG. 6, the key de-mapping module 632 may identify which encryption key stored in the memory maps to the received encryption key indicated in the token provided by the host device 104.

As represented by block 906, the controller may determine a sub-stream identifier corresponding to the requested encoded data that is associated with the matching encryption key based on a mapping between the plurality of encryption keys and respective ones of a plurality of sub-stream identifiers. For example, each sub-stream identifier may identify the associated host device program to which the data stream pertains. For instance, referring to FIG. 6, the key de-mapping module 632 may identify the associated host device program by way of identifying which sub-stream identifier is mapped to the matching encryption key via a mapping table maintained by the key management module 630.

As represented by block 908, the controller may obtain one or more encoded data stream portions that correspond to the sub-stream identifier from an encoded data stream stored in the memory. In some aspects, the encoded data stream includes a plurality of encoded data stream portions that correspond to different sub-stream identifiers associated with different encryption keys. In one or more implementations, the controller may identify which of the plurality of encoded data stream portions are associated with the matching encryption key. For instance, referring to FIG. 6, the memory controller 123 may retrieve encoded data that is stored in at least a portion of the NVM 110 by accessing a physical address in the memory that corresponds to a logical address associated with the sub-stream identifier.

As represented by block 910, the controller may decode the one or more encoded data stream portions with the matching encryption key into respective decoded data stream portions. For instance, referring to FIG. 6, the memory controller 123, through coordination with the decryption module 622, may decrypt the retrieved encoded data stream portions and feed the respective decrypted portions to the data generator module 612. As such, the data generator module 612 may generate an output transport stream that includes only the decrypted data stream portions that match with the encryption key provided in the request. In this regard, the retrieved data is limited to only the requested data and other data stream portions that belong to a same data stream as the requested data can remain stored in the memory to safeguard the data against unnecessary full access and/or unauthorized access to protected data.

As represented by block 912, the controller may send the respective decoded data stream portions to the host device in response to the request. For instance, referring to FIG. 6, the memory controller 123 may send the requested data to the host device 104 over the bus/network 108.

Figure 10:
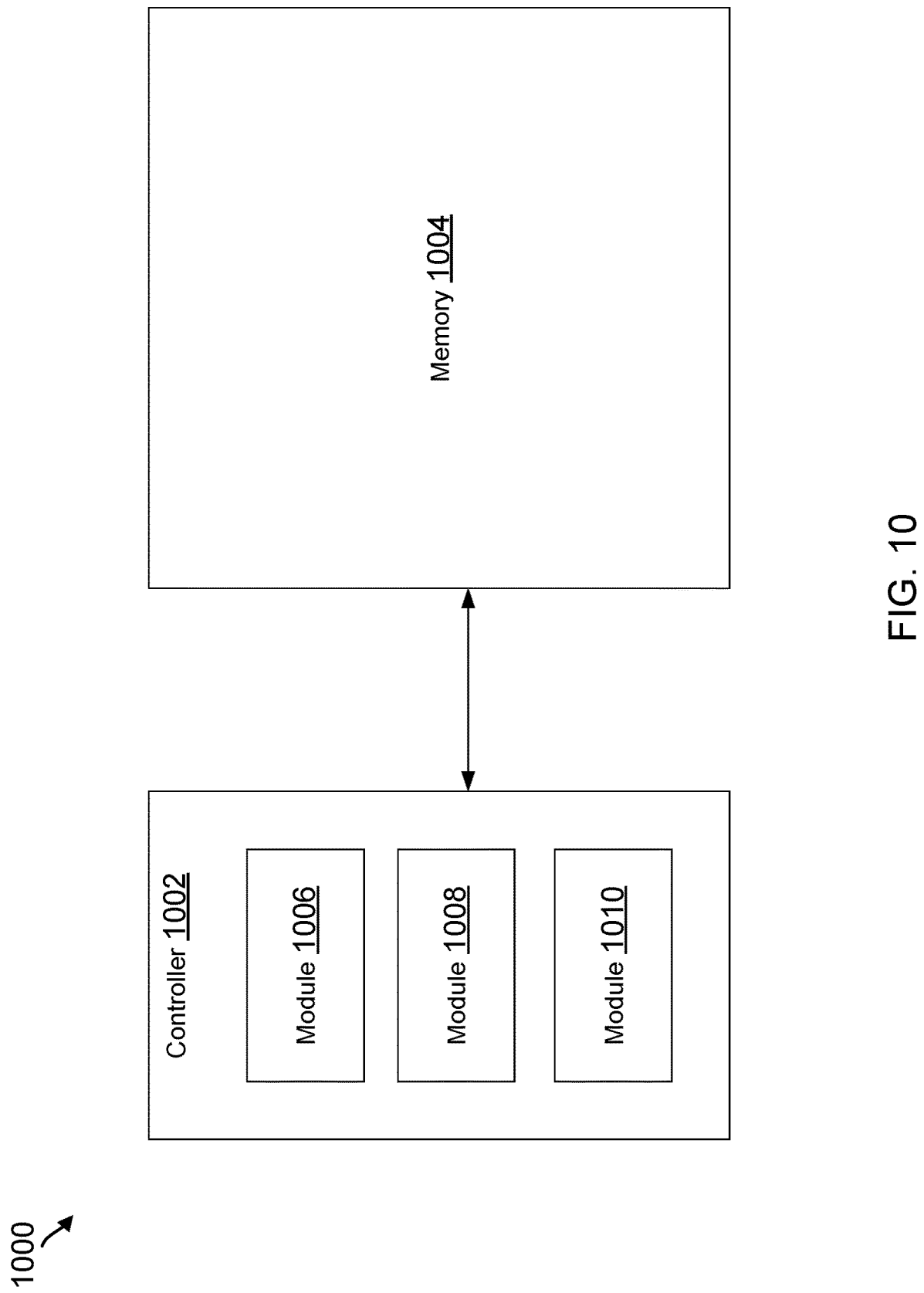
FIG. 10 is a conceptual diagram illustrating an example of a controller that performs key based partial data restriction in the storage device of FIG. 1.

FIG. 10 is a conceptual diagram illustrating an example 1000 of a controller 1002 coupled to a memory 1004 in a storage device. For example, controller 1002 may correspond to controller 123 and memory 1004 may correspond to the NVM 110 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The controller 1002 may include a data module 1006 that may provide a means for receiving a data stream from a host device, where the data stream indicates a plurality of encryption keys associated with the data stream. For example, the data module 1006 may perform the aforementioned process described at 702. In one configuration, the data module 1006 may be further configured to segregate the data stream into a plurality of data stream portions based on the plurality of encryption keys, e.g., as described in connection with 704. In other implementations, the controller 1002 may provide a means for receiving an encoded data stream from a host device, where the encoded data stream includes a plurality of encoded data stream portions associated with respective ones of a plurality of encryption keys. For example, the controller 1002 may perform the aforementioned process described at 802.

The controller 1002 may also include an encoding/decoding module 1008 that may provide a means for encoding the plurality of data stream portions into a plurality of encoded data stream portions with the plurality of encryption keys. For example, the encoding/decoding module 1008 may perform the aforementioned process described at 706.

The controller 1002 may also include a key management module 1010 that may provide a means for generating a mapping indicating an association between each of the plurality of encryption keys with a respective one of the plurality of encoded data stream portions. For example, the key management module 1010 may perform the aforementioned process described at 708. In other implementations, the key management module 1010 may perform the aforementioned process described at 804.

In one configuration, the controller 1002 may provide a means for storing the plurality of encoded data stream portions and the plurality of encryption keys in the memory based on the mapping, e.g., as described in connection with 710. In other implementations, the controller 1002 may perform the aforementioned process described at 806.

In some implementations, the data module 1006 may be further configured to receive a request to access encoded data stored in the memory from a host device during a data retrieval process, where the request includes a token corresponding to the requested encoded data. For example, the controller 1002 may perform the aforementioned process described at 902.

In some implementations, the key management module 1010 may be further configured to determine a matching encryption key that corresponds to the token from a plurality of encryption keys stored in a data structure of the memory. For example, the key management module 1010 may perform the aforementioned process described at 904.

In some implementations, the key management module 1010 may be further configured to determine a sub-stream identifier corresponding to the requested encoded data that is associated with the matching encryption key based on a mapping between the plurality of encryption keys and respective ones of a plurality of sub-stream identifiers. For example, the key management module 1010 may perform the aforementioned process described at 906.

In one configuration, the controller 1002 may provide a means for obtaining one or more encoded data stream portions that correspond to the sub-stream identifier from an encoded data stream in the memory, e.g., as described in connection with 908.

In some implementations, the encoding/decoding module 1008 may be further configured to decode the one or more encoded data stream portions with the matching encryption key into respective decoded data stream portions. For example, the encoding/decoding module 1008 may perform the aforementioned process described at 910.

In one configuration, the controller 1002 may provide a means for sending the respective decoded data stream portions to the host device in response to the request, e.g., as described in connection with 912.

Accordingly, the controller described in the present disclosure improves security of data stored in the storage device by limiting access of segregated data to entities with a matching encryption key and restricting access to entities with a non-matching encryption key (or non-request). For instance, a data stream can be segregated, encrypted and stored in non-volatile memory based on an associated encryption key and retrieval of stored encoded data can be accessed by an entity that provides an encryption key that matches the segregated data stream portion encoded with the encryption key. In this way, the controller may facilitate a key-based data segregation and encryption mechanism for increasing data security in storage devices. Accordingly, the key-based partial data restriction in storage systems may be accomplished with minimal changes to controller logic while reducing any latency in identifying data streams requiring storage and security.

The various aspects of this disclosure are provided to enable one of ordinary skill in the art to practice the present disclosure. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a non-volatile memory; and
a controller configured to:
receive a data stream from a host device, the data stream indicating a plurality of encryption keys associated with the data stream;
segregate the data stream into a plurality of data stream portions based on the plurality of encryption keys;
encode the plurality of data stream portions into a plurality of encoded data stream portions with the plurality of encryption keys;
generate a mapping indicating an association between each of the plurality of encryption keys with a respective one of the plurality of encoded data stream portions; and
store the plurality of encoded data stream portions and the plurality of encryption keys in the non-volatile memory based on the mapping.

2. The storage device of claim 1, wherein the data stream comprises a plurality of sub-stream identifiers corresponding to different programs associated with the host device, wherein each of the plurality of encryption keys is associated with one or more of the plurality of sub-stream identifiers.

3. The storage device of claim 2, wherein each of the plurality of data stream portions is associated with a different sub-stream identifier of the plurality of sub-stream identifiers.

4. The storage device of claim 3, wherein the plurality of data stream portions comprises a first data stream portion associated with a first sub-stream identifier that corresponds to a first program of the host device and a second data stream portion associated with a second sub-stream identifier that corresponds to a second program of the host device, wherein the controller is further configured to encode the first data stream portion with a first encryption key of the plurality of encryption keys that is associated with the first sub-stream identifier into a first encoded data stream portion and encode the second data stream portion with a second encryption key of the plurality of encryption keys that is associated with the second sub-stream identifier into a second encoded data stream portion.

5. The storage device of claim 4, wherein the first encoded data stream portion and the second encoded data stream portion are stored sequentially in a same logical block.

6. The storage device of claim 4, wherein the first encoded data stream portion is stored in a first logical block associated with the first sub-stream identifier and the second encoded data stream portion is stored in a second logical block different than the first logical block that is associated with the second sub-stream identifier.

7. The storage device of claim 2, wherein the mapping further indicates an association between each of the plurality of encryption keys with respective ones of the plurality of sub-stream identifiers.

8. The storage device of claim 7, wherein the mapping indicates a first set of logical addresses to the non-volatile memory for the plurality of sub-stream identifiers, wherein each of the plurality of encoded data stream portions is stored at a location in the non-volatile memory that corresponds to a logical address of an associated sub-stream identifier within the first set of logical addresses.

9. The storage device of claim 8, wherein the controller is further configured to:
store the plurality of encryption keys in the non-volatile memory based on the mapping,
wherein the mapping indicates a second set of logical addresses to the non-volatile memory for the plurality of encryption keys, wherein each of the plurality of encryption keys is stored at a location in the non-volatile memory that corresponds to a logical address within the second set of logical addresses, and wherein the mapping indicates an association between the first set of logical addresses and the second set of logical addresses.

10. The storage device of claim 1, wherein the controller is further configured to receive the plurality of encryption keys from the host device, wherein the plurality of encryption keys are tagged in respective payloads of the data stream.

11. The storage device of claim 2, wherein the data stream comprises a plurality of encryption key identifiers that respectively correspond to the plurality of encryption keys, wherein the controller is further configured to generate the plurality of encryption keys based on the plurality of sub-stream identifiers and the plurality of encryption key identifiers.

12. A storage device, comprising:
a non-volatile memory; and
a controller configured to:
- receive an encoded data stream from a host device, the encoded data stream comprising a plurality of encoded data stream portions associated with respective ones of a plurality of encryption keys;
- generate a mapping indicating an association between each of the plurality of encryption keys with one or more of a plurality of sub-stream identifiers that correspond to respective ones of the plurality of encoded data stream portions; and
- store the plurality of encoded data stream portions and the plurality of encryption keys in the non-volatile memory based on the mapping.

13. The storage device of claim 12, wherein the controller is further configured to receive the plurality of encryption keys from the host device.

14. The storage device of claim 12, wherein each of the plurality of encoded data stream portions is associated with a different sub-stream identifier of the plurality of sub-stream identifiers.

15. The storage device of claim 12, wherein the mapping further indicates an association between each of the plurality of encryption keys with respective ones of the plurality of sub-stream identifiers.

16. The storage device of claim 15, wherein the mapping indicates a first set of logical addresses to the non-volatile memory for the plurality of sub-stream identifiers, wherein each of the plurality of encoded data stream portions is stored at a location in the non-volatile memory that corresponds to a logical address of an associated sub-stream identifier within the first set of logical addresses.

17. The storage device of claim 16, wherein the mapping indicates a second set of logical addresses to the non-volatile memory for the plurality of encryption keys, wherein each of the plurality of encryption keys is stored at a location in the non-volatile memory that corresponds to a logical address within the second set of logical addresses, and wherein the mapping indicates an association between the first set of logical addresses and the second set of logical addresses.

18. A storage device, comprising:
a non-volatile memory; and
a controller configured to:
- receive a request to access encoded data stored in the non-volatile memory from a host device, the request comprising a token corresponding to the requested encoded data;
- determine a matching encryption key that corresponds to the token from a plurality of encryption keys stored in a data structure of the non-volatile memory;
- determine a sub-stream identifier corresponding to the requested encoded data that is associated with the matching encryption key based on a mapping between the plurality of encryption keys and respective ones of a plurality of sub-stream identifiers;
- obtain one or more encoded data stream portions that correspond to the sub-stream identifier from an encoded data stream in the non-volatile memory;
- decode the one or more encoded data stream portions with the matching encryption key into respective decoded data stream portions; and
- send the respective decoded data stream portions to the host device in response to the request.

19. The storage device of claim 18, wherein the encoded data stream comprises a plurality of encoded data stream portions that correspond to different sub-stream identifiers associated with different encryption keys, and wherein the controller is further configured to identify which of the plurality of encoded data stream portions are associated with the matching encryption key.

20. The storage device of claim 18, wherein the token indicates an input encryption key from the host device, and wherein the controller is further configured to compare the input encryption key against the plurality of encryption keys indicated in the mapping to determine the matching encryption key.

* * * * *